United States Patent Office 2,924,071
Patented Feb. 9, 1960

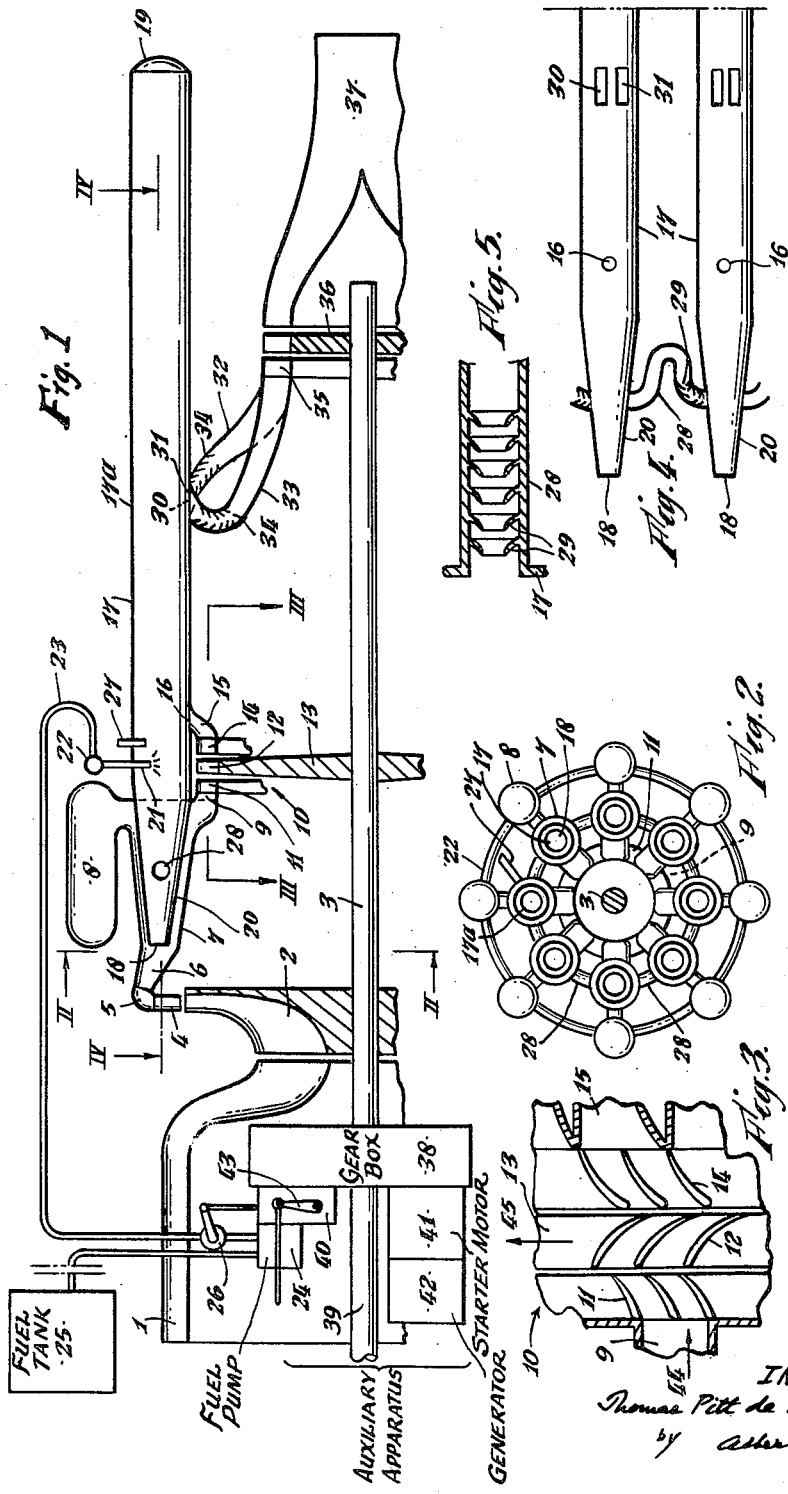

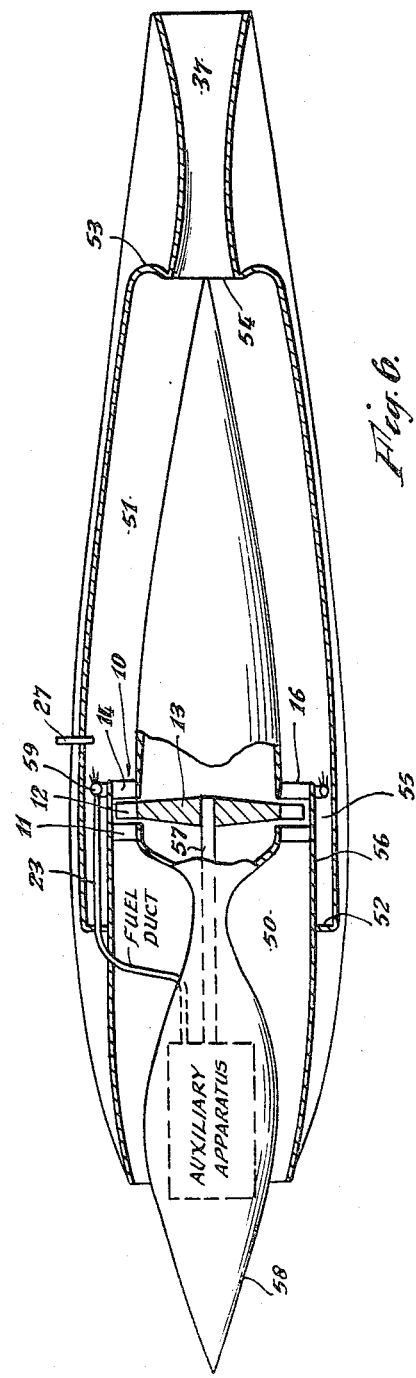

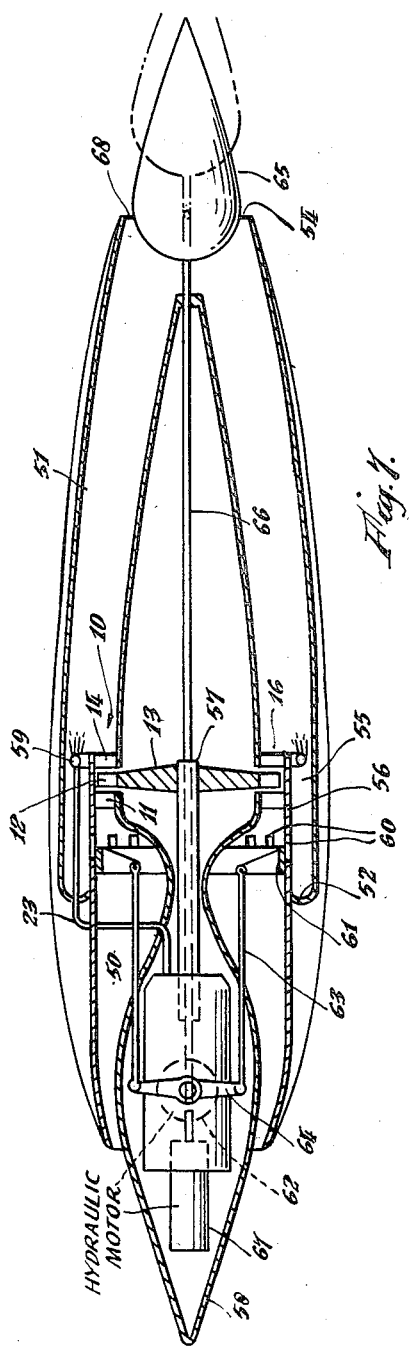

2,924,071

RESONANCE COMBUSTION APPARATUS WITH A THERMODYNAMICALLY CONTROLLED GAS CIRCUIT

Thomas Pitt de Paravicini, Shepton Mallet, England, assignor to Normalair Limited, Yeovil, England, a British company Application February 23, 1955, Serial No. 490,060

Claims priority, application Great Britain February 25, 1954

9 Claims. (Cl. 60—39.77)

This invention relates to combustion gas turbine or jet engines.

More particularly, the present invention relates to engines of the kind comprising essentially a combustion chamber having an inlet port receiving fresh air from an inlet passage, and an exhaust port for the combustion products, combustible mixture being created in the combustion chamber by the introduction thereinto of fuel through an atomizing nozzle. The engine may embody a turbo-compressor aggregate having a compressor situated in the inlet passage and driven by a turbine situated in an outlet passage leading from the exhaust port, in which case the engine is suitable for driving an output shaft, e.g. an airscrew shaft, apart from being suitable as a reaction propulsion engine. On the other hand the engine may be of compressorless design for reaction propulsion purposes only. All such engines will be hereinafter referred to as "an engine of the kind described."

The main object of this invention is to provide an improved thermo-dynamic system in such engine.

A further object of this invention is to provide in a gas circuit for a thermo-dynamic system an improved means for controlling the non-return passage of the gas.

According to this invention an engine of the kind described is characterized in that combustion takes place in the combustion chamber in a two-stroke resonance cycle.

Further according to this invention, there is provided a gas circuit for a thermo-dynamic system embodying a return-resisting valve comprising a rotor provided with blades situated between the inlet and outlet openings of the valve, the blades being inclined with the leading face directed towards the outlet.

Several forms of this invention will now be described with reference to the accompanying drawings, wherein:

Fig. 1 illustrates diagrammatically an engine according to a first form of the invention and is a sectional elevation, partly broken away, of the engine, Fig. 2 is a sectional front elevation of the engine shown in Fig. 1, the section being taken at a reduced scale on the line II—II of that figure, Fig. 3 is an enlarged section on the line III—III of Fig. 1, showing a detail, Fig. 4 is a section on the line IV—IV in Fig. 1, showing two adjacent combustion pipes, and Fig. 5 is an enlarged detail of Fig. 4;

Fig. 6 illustrates an engine according to a second form of this invention and is a section elevation of the engine, and Fig. 7 illustrates in sectional elevation a modification of the engine shown in Fig. 6.

Referring to Figs. 1 to 5, there is provided a combustion turbine engine having an annular inlet duct 1 leading to a centrifugal compressor 2 whose rotor is secured to a shaft 3 and which delivers air through a diffuser vane ring 4 into an annular chamber 5 which has a plurality of outlet branches 6. Each outlet branch 6 is formed into a frusto-conical cooling jacket 7 which is connected to a pressure equalization reservoir 8 and which has an outlet port 9 to a dynamic non-return valve 10 which is common to all the jackets 7. The valve 10 comprises a stationary ring of nozzle blades 11 leading to a ring of blades 12 mounted on a rotor 13 secured to the shaft 3 and in turn leading to a stationary ring of blades 14 from which separate short ducts 15 each lead through an inlet port 16 into a combustion or resonance pipe 17, a plurality of which are arranged in parallel relationship about the shaft 3 but only one of which is shown in Fig. 1. The total passage from the inlet duct 1 to the ports 16 forms the inlet passage of the engine. Each pipe 17 is closed at both its ends 18 and 19 and has a tapered front end portion 20 which extends into the jacket 7. The longitudinal distance between the port 16 and the front end 18 of the pipe 17 does not exceed about one quarter of the length of the pipe 17. Each pipe 17 is provided longitudinally between its front end 18 and the port 16 with a fuel atomizing nozzle 21 connected to a fuel pipe ring 22 common to all the nozzles 21. The ring 22 is adapted to be supplied with a continuous flow of fuel through a duct 23 from a pump 24 taking fuel from a tank 25, and the duct 23 is controlled by a throttle valve 26. An igniter plug 27 is provided in one of the pipes 17 which is also denoted 17a and is hereinafter referred to as the starting pipe. Any two adjacent pipes 17 are interconnected by a duct 28 which is of relatively small diameter (Figs. 2 and 4) and which is provided near one of its ends with a set of internal one-way baffles 29 (Figs. 4 and 5) consisting of nested substantially frusto-conical tube elements. Each set of baffles 29 is situated near that end of its associated duct 28 which points in a clockwise direction (Fig. 2) and the baffles 29 are convergent towards the pipe 17 nearest to them. The aggregate length of the ducts 28 and the diameters of the pipes 17 where intersected by the ducts 28 are equal to twice the length of one pipe 17 and to make up the necessary distance the ducts 28 are looped as shown in Fig. 4. Each pipe 17 is provided medially of its length with two ports 30 and 31 which are arranged side by side transversely in respect of the pipe 17 and which lead, respectively, to two exhaust ducts 32 and 33. The ducts 32 and 33 are each inclined to form an acute angle with the pipe 17 but the duct 32 extends from the pipe 17 in a rearward direction whereas the duct 33 extends from the pipe 17 in a forward direction. Further, the ducts 32, 33 are each provided with a set of internal one-way baffles 34 consisting of nested substantially frusto-conical tube elements which are convergent away from the ports 30, 31. The baffles 34 are similar to the baffles 29 (Fig. 5). All the ducts 32, 33 discharge into a stationary nozzle ring 35 leading to the blade ring of a turbine wheel 36 secured to shaft 3 and discharging into an exhaust passage or jet tube 37. The total passage from the ports 30, 31 to the discharge end of the engine exhaust duct 37 forms the outlet passage of the engine. At its front end the shaft 3 leads into a gearbox 38 through the intermediary of which the shaft 3 is adapted to drive an airscrew shaft 39 and the engine's auxiliary apparatus which comprises the pump 24, a speed governor 40 controlling the valve 26, a starter motor 41 and a generator 42. The governor 40 is subject to an over-riding manual control 43.

To start the engine the shaft 3 is rotated by the starter motor 41 whereby a draught of air is passed from the compressor 2 through the rotary valve 10 into each of the pipes 17 and out through the ports 30, 31 and the exhaust passage 37, the pipes 17 being scavenged thereby. Next a fuel/air mixture is created in the pipes 17 by opening the valve 26, and the ignition circuit of the plug 27 is switched on. As soon as the fuel/air mixture in the starting pipe 17a and in the neighborhood of the plug 27 reaches ignitable proportions there occurs an explosion setting up a pressure wave which travels substantially rearwardly the length of the starting pipe 17a and returns upon reflection at the rear end 19 thereof. Meanwhile fresh mixture has been created and when the peak of the returning pressure wave substantially reaches the front end 18 of the starting pipe 17a the fresh mixture is ignited by compression ignition, so that after the initial explosion successive pressure waves and explosions maintain each other without the use of the plug 27 which is eventually switched off. The period between successive explosions is referred to as the resonance cycle. From each explosion in the starting pipe 17a a flame passes through the adjoining duct 28 in the clockwise direction (Fig. 2) into the adjacent pipe 17 igniting the mixture therein, and so on through successive pipes 17 until the engine is started, i.e. until all the pipes 17 have commenced firing. The engine has a clockwise firing order, and the baffles 29 prevent a departure from that order and thus maintain the pressure oscillations in the pipes 17 in a phase relationship desirable for a smooth running of the engine. The supply of fuel into the pipes 17 is continuous but the supply of fresh air is intermittent and takes place when the peak of the pressure wave is away from the front end 18 of the pipe 17, i.e. when there is a low pressure phase in the neighborhood of the port 16. During the explosions the pressure in the front end portion 20 of the pipe 17 may exceed the air pressure supplied by the compressor 16 with a corresponding advantage for the thermal efficiency of the engine, but insofar as the explosion pressure tends to reverse the flow of air from the compressor such reversal is resisted by the dynamic non-return valve 10.

Referring now more particularly to Fig. 3, the general direction of air flow is indicated by the arrow 44 and the direction of travel of the blades 12 by the arrow 45. It will be seen that the blades 11 accelerate the axially incoming air into the direction of rotation of the blades 12 while the blades 14 direct the air leaving the blades 12 back into the axial direction. The blades 12 are set for their outlet ends to form a relatively small inclination away from their direction of travel and as a result the air leaving these blades has a relatively low axial velocity component. The blades 12 themselves are operated at as high a velocity as possible. As a result the aerodynamic conditions of the flow through and from the blades 12 are such that a flow in the reverse direction is discouraged since such reverse flow would require a sharp acceleration of the air between the blades 14 and the blades 12 in the reverse direction. Preferably the blades 12 are operated at a velocity as close as possible to that of sound and in that case the resistance to return flow is particularly efficient because returning air would have to accelerate to above the velocity of sound. By virtue of the dynamic non-return valve 10 the combustion pressure in the pipes 17 is not wholly dependent on the delivery pressure of the compressor 2 and higher combustion pressures than would otherwise be possible may be employed for any given compressor output with a resulting increase in the thermal efficiency of the engine. The pipes 17 each exhaust through their ports 30, 31 whose position medially between the ends of the pipe 17 exposes them to a very little pressure oscillation but to a considerable velocity surge. By virtue of the inclined position of the ducts 32, 33 exhausting takes place through them during the rearward and the forward surge of the gases, respectively, but during the remainder of the pressure cycle exhaust takes place through the port ducts 32, 33 more or less simultaneously. Since the ducts 32, 33 are subject to little pressure oscillation and are moreover provided with the one-way baffles 34 and combine in the nozzle ring 35, the turbine nozzle pressure is substantially constant.

The amplitude of the pressure oscillations is to some degree governed by the ratio of the cross-sectional area of the pipe 17 over the area of its outlet ports 30, 31. This ratio is hereinafter referred to as the area ratio. It will be seen that in the present example the area ratio is relatively high. Since an explosion occurs every time the wave of its preceding explosion has travelled twice the length of the tube 17, the resonance cycle may be referred to as a two-stroke resonance cycle on the analogy of the relationship of combustion and piston movement in piston engines.

Referring now generally to the dynamic non-return valve 10, this has been set forth in the form of an axial flow unit, but it will be appreciated that it may be constructed in an equivalent radial flow form.

Referring to Fig. 6, there is provided a jet engine of compressorless design and comprising a diverging-converging annular air inlet chamber 50 leading directly to the dynamic non-return valve 10 which in turn leads directly to the—in this case annular—inlet port 16 into an annular combustion or resonance chamber 51 having a closed front end 52 and a rear end 53 the central portion of which is open to form an exhaust port 54 leading to the exhaust duct 37 which in this case is formed as a converging-diverging exhaust nozzle. Further, the chamber 51 has a front end portion 55 embracing the rear portion of the chamber 50, there being a dividing wall 56 between them. The rotor 13 of the valve 10 is secured to a shaft 57 leading to a nose housing 58 containing the auxiliary apparatus of the engine which is substantially the same as that described with reference to Figs. 1 to 5 and which is therefore not particularly illustrated in the present case. The fuel duct 23 is taken to a spray ring 59 in the chamber 51 and one igniter plug 27 is provided at the end 52 of the chamber 51.

To start the engine, the rotor 13 of the valve 10 is rotated by the starter motor of the auxiliary apparatus which causes the blades 12 to act as a fan, although not of high efficiency, and produces a scavenging draught of fresh air through the chamber 51. Next fuel and ignition are switched on and as soon as the fuel/air ratio in the neighborhood of the plug 27 is correct an explosion occurs and there commences a resonance cycle analogous to that described with reference to Figs. 1 to 5. As the pressure waves travel fore and aft through the chamber 51 fresh air is drawn in through the valve 10 every time the low pressure occurs at the port 16 whereby a fresh rotational impulse is imparted to the rotor 13 and the pressure wave is efficiently reflected when reaching the port 16, and thus the valve 10 again. Ram air enters the inlet 50 and the drop in pressure causes air to issue at high velocity and impinge on the blades of the valve wheel 12 giving forward impulse to the valve wheel. A high proportion of the high velocity energy of this air is reconverted to pressure in the second set of stator blades 14. The engine exhausts through the port 54 and each rearwardly travelling pressure wave is partly exhausted while the remainder is reflected at the end 53 of the chamber 51.

Referring to Fig. 7, there is provided an engine similar to that shown in Fig. 6, but additionally provided with means for by-passing the valve 10 and means for varying the area of the exhaust port 54 and thereby varying the pressure ratio. The means for by-passing the valve 10 comprise ports 60 in the wall 56 controlled by a closure member having the form of a cylinder 61 connected for axial movement to a hydraulic motor 62 through the intermediary of connecting rods 63 and levers 64. The means for varying the area of the port 54 comprise a plug 65 secured to a rod 66 extending forwards through a coaxial aperture in the shaft 57 to a hydraulic motor 67, by the operation of whcih the rod 66 and thus the plug 65 may be moved axially between the positions shown in full and in chain-dotted lines. The chamber 51 has an open rear end 68 and the port 54 is formed annularly between this end 68 and the plug 65.

When the ports 60 are closed and the plug 65 is at or near its forward position the engine is operated in a manner analogous to the engine described with reference to Fig. 6. However, if the plug is moved rearward to an extent increasing the area of the exhaust port 54 beyond a critical range any one rearwardly travelling pressure wave is reflected at the end 68 as a suction wave which travels forwards, is reflected at the valve 10 and the end 52, returns again and is finally reflected at the end 68 as a pressure wave which travels forwards and causes the next explosion. This cycle of pressure and suction waves may be referred to as a four-stroke resonance cycle as distinct from the two-stroke resonance cycle defined hereinabove. If, irrespective of the position of the plug 65, the ports 60 are opened by operation of the hydraulic motor 62 pressure oscillations in the chamber 51 disappear, fuel burning becomes uniform and the engine operates on what is known as a constant pressure ram-jet cycle, i.e. a cycle relying on a high speed flow of ambient air into the chamber 50.

What I claim and desire to secure by Letters Patent is:

1. A resonance combustion apparatus comprising a combustion chamber provided with an inlet thereto and an outlet therefrom, and a uni-directional valve provided solely in said inlet, the uni-directional valve comprising spaced fixed blades and a rotor member provided with an annulus of blades between the fixed blades and disposed between upstream and downstream openings of the uni-directional valve so that air passing from the upstream opening to the downstream opening must pass between said rotor blades, said rotor blades being secured to the rotor member so as to extend from the upstream opening obliquely rearwardly in respect of the direction of rotation of said annulus to thereby admit air from the upstream opening substantially so long as the upstream pressure exceeds the downstream pressure, but to repel any reverse flow of gases at the downstream opening when the downstream pressure exceeds the upstream pressure.

2. A resonance combustion apparatus according to claim 1, in which means is provided for rotating said rotor member.

3. A resonance combustion apparatus comprising a combustion chamber having an inlet and an outlet, and a uni-directional flow rotary valve in said inlet comprising at least a pair of rows of stationary blades and a single row of rotatable blades between said stationary blades, the first row of stationary blades being arranged at an angle accelerating axially incoming air in the direction of rotation of said row of rotatable blades, said single row of rotatable blades being driven by the air passing through said stationary blades and having an inclination away from the direction of rotation thereof, the second row of stationary blades being inclined to direct the air exhausted therefrom back into the axial direction.

4. In a resonance combustion apparatus, an annular series of resonance combustion units each comprising a combustion chamber having an inlet and an outlet, a uni-directional flow rotary valve in said inlet comprising at least a pair of rows of stationary blades and a single row of rotatable blades between said stationary blades, the first row of stationary blades being arranged at an angle accelerating axially incoming air in the direction of rotation of said row of rotatable blades, said single row of rotatable blades having a relatively small inclination away from the direction of rotation thereof, the second row of stationary blades being inclined to direct the air exhausted therefrom back into the axial direction and means driven by the exhaust gas in said outlet for rotating said row of rotatable blades.

5. In a resonance combustion apparatus according to claim 4, said second row of stationary blades communicating with said combustion chamber at a point of communication between the combustion chamber and the blade structure not exceeding substantially one quarter of the length of said combustion chamber from the front end thereof.

6. In a resonance combustion apparatus according to claim 4, said outlet communicating with said combustion chamber at a point substantially half of the length of said combustion chamber.

7. In a resonance combustion apparatus according to claim 4, said outlet including a pair of pipes respectively frontwardly and rearwardly inclined relative to said combustion chamber whereby exhausting occurs through said pipes alternately during high velocity surge portions of the operational cycle and simultaneously through said pair of pipes during the remainder of said cycle.

8. A resonance combustion apparatus comprising an air inlet, a combustion cylinder communicating with said air inlet and having a fuel inlet and combustion products exhaust, said combustion cylinder being provided with a head portion of reduced cross-sectional area relative to the cross-sectional area of the remainder of said combustion cylinder, said air inlet together with said fuel inlet and said exhaust being positioned in said remainder of said combustion cylinder, a one-way multi-bladed rotary valve upstream from said air inlet for introducing air into said combustion cylinder, said head portion being of reduced cross-sectional area to form a compression zone at the head of said cylinder wherein the fuel-air mixture automatically explodes during operation of the apparatus, said exhaust including a pair of pipes respectively frontwardly and rearwardly inclined relative to said combustion cylinder whereby exhausting occurs through said pipes alternately during the high velocity surge portion of the operational cycle and simultaneously through said pair of pipes during the remainder of said cycle.

9. A resonance combustion apparatus comprising an air inlet, a combustion cylinder communicating with said air inlet and having a fuel inlet and combustion products exhaust, said combustion cylinder being provided with a head portion of reduced cross-sectional area relative to the cross-sectional area of the remainder of said combustion cylinder, said air inlet together with said fuel inlet and said exhaust being positioned in said remainder of said combustion cylinder, a one-way multi-bladed rotary valve upstream from said air inlet for introducing air into said combustion cylinder, said head portion being of reduced cross-sectional area to form a compression zone at the head of said cylinder wherein the fuel-air mixture automatically explodes during operation of the apparatus wherein said one-way valve comprises a rotor member provided with two radially disposed rows of aerodynamically shaped static blades disposed between upstream and downstream openings of the one-way valve so that air passing from the upstream opening to the downstream opening must pass between said blades, said blades being secured to the rotor member so as to extend from the upstream opening obliquely rearwards in respect of the direction of rotation of the annulus to admit air from the upstream opening substantially so long as the upstream pressure exceeds the downstream pressure, but to repel any reverse flow of gases at the downstream opening when the downstream pressure exceeds the upstream pressure.

References Cited in the file of this patent

UNITED STATES PATENTS

| | | |
|---|---|---|
| 2,508,396 | Jordan | May 23, 1950 |
| 2,515,644 | Goddard | July 18, 1950 |
| 2,543,758 | Bodine | Mar. 6, 1951 |
| 2,602,291 | Farnell | July 8, 1952 |

FOREIGN PATENTS

| | | |
|---|---|---|
| 412,478 | France | May 3, 1910 |
| 844,442 | France | Apr. 24, 1939 |